(12) United States Patent
Takeda

(10) Patent No.: US 6,489,599 B2
(45) Date of Patent: Dec. 3, 2002

(54) OPTICAL PICKUP DEVICE

(75) Inventor: Tadashi Takeda, Nagano (JP)

(73) Assignee: Kabushiki Kaisha Sankyo Seiki Seisakusho, Nagano (JP)

(*) Notice: Subject to any disclaimer, the term of this patent is extended or adjusted under 35 U.S.C. 154(b) by 0 days.

(21) Appl. No.: 09/802,897

(22) Filed: Mar. 12, 2001

(65) Prior Publication Data

US 2001/0022690 A1 Sep. 20, 2001

(30) Foreign Application Priority Data

Mar. 10, 2000 (JP) ......................................... 2000-065832

(51) Int. Cl.[7] ................................................. G02B 27/40
(52) U.S. Cl. ............................... 250/201.5; 250/214 R; 369/103
(58) Field of Search ............................ 250/201.5, 216, 250/214 R; 369/112.23–26, 53.22–23, 44.11, 44.12, 44.14, 44.23, 103, 109.01, 112.03, 112.04; 359/721, 719; 270/201.2, 201.4, 237 R, 237 G

(56) References Cited

U.S. PATENT DOCUMENTS

| | | | | |
|---|---|---|---|---|
| 5,828,643 A | * | 10/1998 | Takeda et al. | 369/112.12 |
| 6,043,911 A | * | 3/2000 | Yang | 359/15 |
| 6,043,912 A | * | 3/2000 | Yoo et al. | 359/15 |
| 6,167,017 A | * | 12/2000 | Higashiura et al. | 369/112.04 |
| 6,211,511 B1 | * | 4/2001 | Shih et al. | 250/214 R |
| 6,313,956 B1 | * | 11/2001 | Saito | 359/721 |
| 6,359,845 B1 | * | 3/2002 | Lee et al. | 369/112.01 |

* cited by examiner

Primary Examiner—Kevin Pyo
Assistant Examiner—Seung C. Sohn
(74) Attorney, Agent, or Firm—Sughrue Mion, PLLC

(57) ABSTRACT

In an optical pickup device, a first light source and a second light source, light emission points of which are not on an identical optical axis, are provided. A first laser light beam and a second laser light beam, wavelengths of which are different from each other, are respectively emitted from the first and second light sources. The first and second laser light-beams reflected from an optical recording medium are diffracted based on different diffraction order, such that the diffracted first and second laser light beams are received by a common light receiving element.

6 Claims, 5 Drawing Sheets

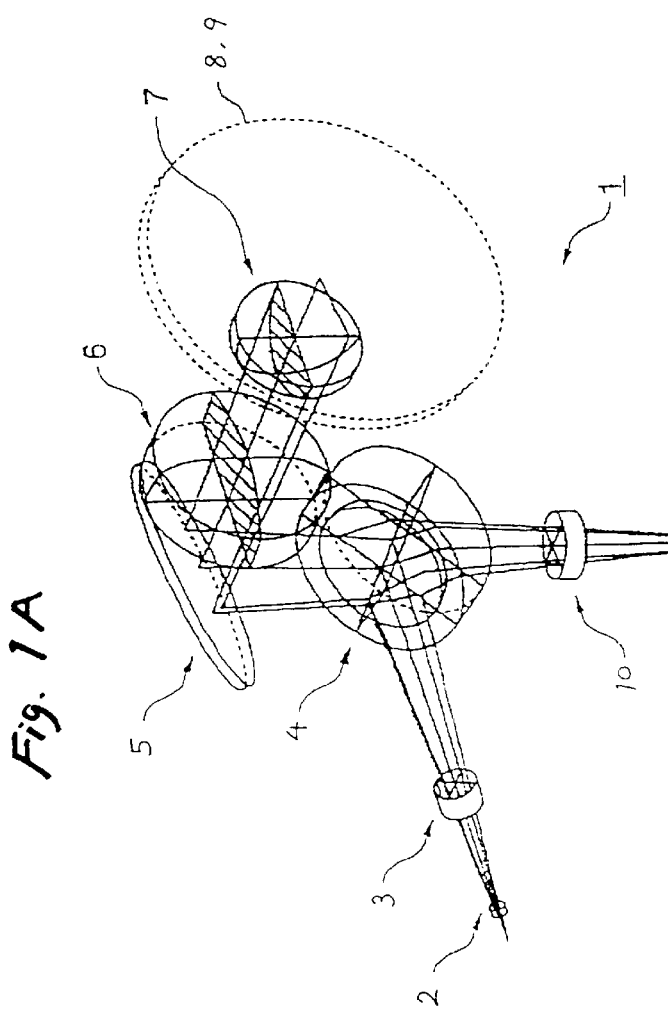
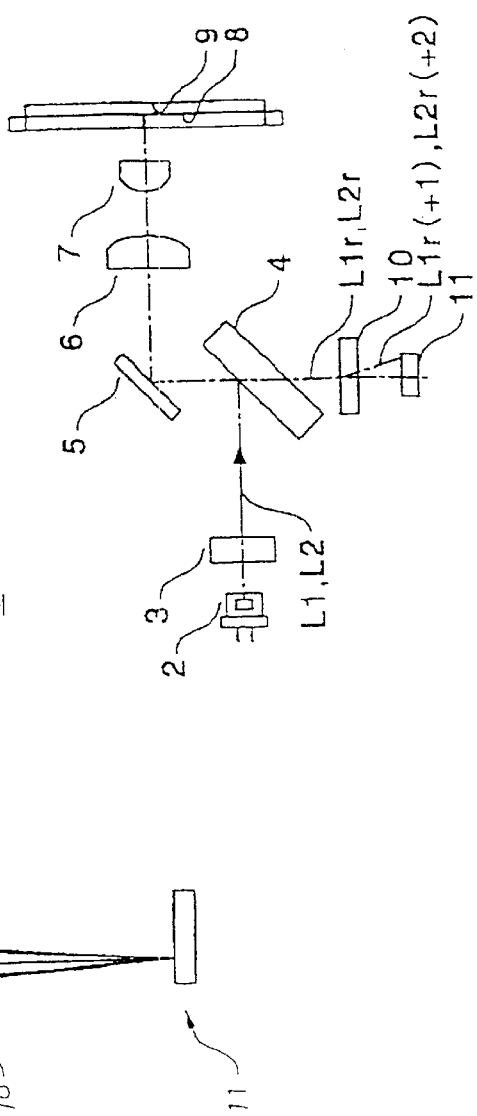

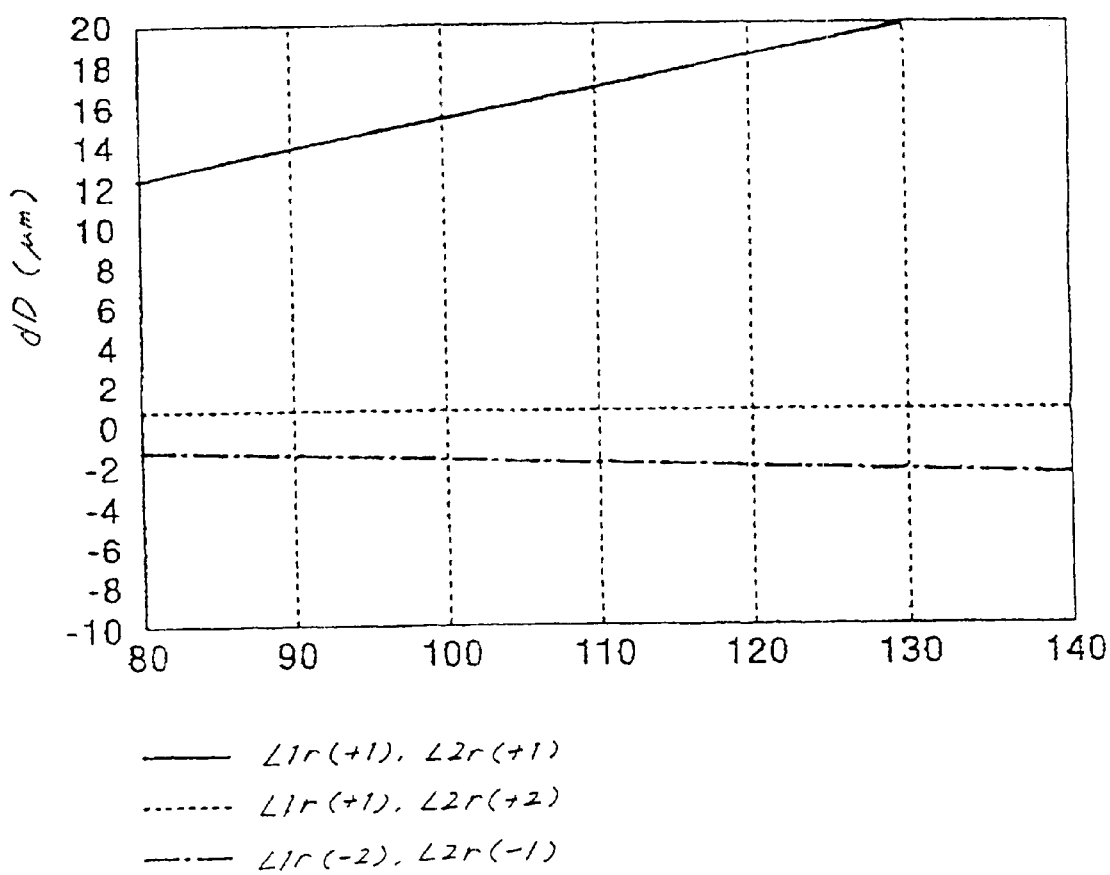

OPTICAL PICKUP DEVICE

BACKGROUND OF THE INVENTION

This invention relates to, in an optical pickup device provided with a plurality of light sources for emitting laser light beams different in wavelength with light emission points not existing on an identical optical axis, a method for receiving a reflected beam from a record side of an optical record medium by a common light receiving element, and relates to an optical pickup device using the light receiving method.

An optical pickup device of multiple light source type, provided with a plurality of laser light sources for emitting laser light beams different in wavelength is known as an optical pickup device for recording and reproducing a signal on a plurality of optical record media different in thickness, track pitch, etc. For example, a laser light beam having a wavelength of 780 nm is required for reproducing CD-R and thus an optical pickup device for reproducing CD-R as well as DVD and CD is of two-light-source type comprising a laser light source having a wavelength of 650 nm and a laser light source having a wavelength of 780 nm.

As such an optical pickup device of two-light-source type, the following configuration is known: As shown in a conceptual drawing of FIG. 5A, a monolithic two-wavelength semiconductor laser chip having a configuration in which light emission points of a red laser and a near-infrared laser, 101 and 102, are built in an active layer of a single semiconductor chip is used, and return light beams emitted from the semiconductor laser chip and then reflected on a reflection face of an optical record medium are diffracted by a hologram element, whereby the light receiving points of the return light beams of both wavelengths are matched and the return light beams are received by a common light receiving element and a signal can be detected.

In this case, the light emission points 101 and 102 for emitting laser light beams L1 and L2 of different wavelengths formed on the semiconductor laser chip 100 are 30 to 300 μm apart from each other. Therefore, the laser light beams emitted from both the light emission points 101 and 102 are not positioned on the same axis. Thus, as shown in FIG. 5B, the optical axes of return light beams L1r and L2r of the wavelengths reflected on an optical record medium (not shown) and incident on a hologram element 103 are also apart at a similar distance from each other.

In the related art, both the return light beams L1r and L2r are diffracted by the hologram element 103 as primary diffracted light and are introduced into a common light receiving element 104. Generally, the wavelength $\lambda_1$ of the return light beam L1r is 650 nm and the wavelength $\lambda_2$ of the return light beam L2r is 780 nm. When a grating pitch of the hologram element 103 is defined as d, diffraction angles $\theta_1$ and $\theta_2$ of the primary diffracted light beams L1r(+1) and L2r(+1) are represented as follows:

$$\theta_1 \cong \frac{D}{h} \cong \frac{\lambda_1}{d}$$

$$\theta_2 \cong \frac{D+\Delta}{h} \cong \frac{\lambda_2}{d}$$

Thus, the following equations can be obtained.

$$D = \frac{\lambda_1}{\lambda_2 - \lambda_1}\Delta = 5\Delta$$

Therefore, the positions at which the primary diffracted light beams L1r(+1) and L2r(+1) can be received by the common light receiving element 104 are positions apart a distance D about five times a light emission point spacing $\Delta$ in a direction perpendicular to the optical axis relative to the return light beams incident on the hologram element 103.

The described optical pickup device introduces the primary diffracted light beam of each wavelength into the common light receiving element. Therefore, the diffraction angle is comparatively large and if the wavelength of the laser light source changes with the environmental temperature, change in the light receiving position on the common light receiving element caused by change in the diffraction angle occurring accordingly is large. If the light receiving position on the common light receiving element changes, an offset easily occurs in a focusing error signal and a tracking error signal. When an offset occurs, an error correction cannot appropriately be made and thus there is a probability of degradation of the recording and reproduction performance of the optical pickup device.

SUMMARY OF THE INVENTION

It is therefore an object of the invention to provide a light receiving method capable of suppressing change in a light receiving position on a common light receiving element in an optical pickup device of multiple light source type and an optical pickup device using the light receiving method.

In order to achieve the above object, according to the present invention, there is provided a light receiving method in an optical pickup device, comprising the steps of:

providing a first light source and a second light source, light emission points of which are not on an identical optical axis;

providing a common light receiving element;

emitting a first laser light beam and a second laser light beam respectively from the first and second light sources, wavelengths of which are different from each other;

converging the first and second laser light beams onto a record face of an optical recording medium; and diffracting the first and second laser light beams reflected from the optical recording medium based on different diffraction order, such that the diffracted first and second laser light beams are received by the common light receiving element.

If the return laser light beams different in wavelength are diffracted based on different diffraction orders, the diffraction angle of the diffracted light beam of each wavelength can be lessened and thus the light receiving position shift on the common light receiving element caused by wavelength change of the light source can be lessened. Consequently, the recording and reproduction performance of a signal becomes stable.

Preferably, the different diffraction order for the first and second laser light beams are respectively selected from the following combinations:

positive primary diffraction and positive secondary diffraction; and negative secondary diffraction and negative primary diffraction.

Preferably, the light receiving method further comprises the step of passing the first and second laser light beams reflected from the optical recording medium through an enlarging optics, before or after the diffracting step.

If the beam diameter is thus enlarged, occurrence of a signal detection error for a light receiving position shift on the common light receiving element can be more suppressed.

Preferably, the light receiving method further comprises the step of detecting at least focusing errors in the first and second laser light beams, based on light amounts detected by the light receiving element. The focusing errors in the first and second laser light beams are detected by the same processing. In this configuration, signal processing circuit can be simplified.

An optical pickup device using the above described method comprises a diffractive element for diffracting the first and second laser light beams reflected from the optical recording medium based on different diffraction order, which is formed with a diffraction grating having a saw-toothed cross sectional shape.

In this configuration, the diffractive direction can be set to a predetermined direction and the yield of light can be enhanced.

Preferably, the diffractive element comprises a concave lens function.

The diffractive element can be provided with a concave lens function. In doing so, the beam diameter of return light can be enlarged for suppressing occurrence of a signal detection error caused by light receiving position change in the common light receiving element, and the function and effect can be provided without increasing the number of optical elements.

BRIEF DESCRIPTION OF THE DRAWINGS

In the accompanying drawings:

FIG. 1A is a schematic drawing to show an optical system of an optical pickup device of two-light-source type according to one embodiment of the invention;

FIG. 1B is a schematic drawing of the optical pickup device when the optical pickup device is developed on a plane;

FIG. 4 is a graph to show change in a light receiving position caused by wavelength fluctuation in the optical pickup device of two-light-source type;

DETAILED DESCRIPTION OF THE PREFERRED EMBODIMENTS

One embodiment of an optical pickup device of two-light-source type incorporating the invention will be discussed with reference to the accompanying drawings.

In order to reproduce a DVD and CD, and to record/reproduce a CD-R, an optical pickup device 1 of two-light-source type comprises a two-wavelength light source 2 for emitting a laser light beam L1 having a wavelength of 650 nm, which is used for the DVD, and a laser light beam L2 having a wavelength of 780 nm, which is used for the CD.

Figure 5A:
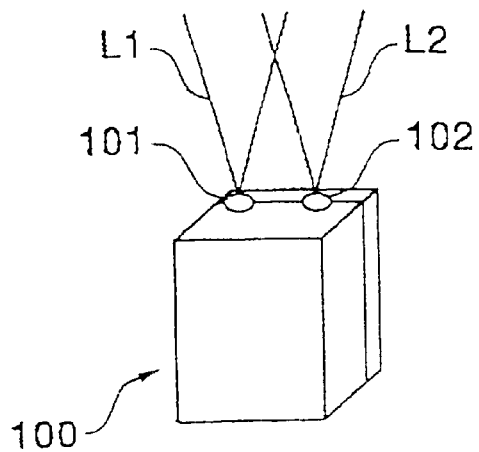
FIG. 5A is a schematic drawing to show a monolithic two-wavelength semiconductor laser chip used with an optical pickup device of two-light-source type.
Figure 5B:
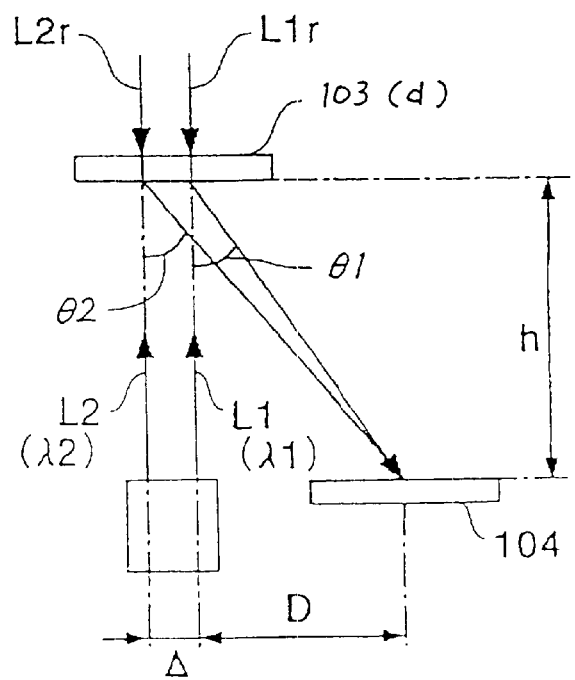
FIG. 5B is a schematic representation to show the relationship between a light emission point spacing and spacing between the light emission point and a light receiving position.

The two-wavelength light source 2 is of monolithic type wherein two light emission points 101 and 102 for emitting laser light beams different in wavelength are formed in an active layer of a single semiconductor laser chip 100, as shown in FIG. 5A. Of course, separate semiconductor laser chips for emitting the laser light beams L1 and L2 having different wavelengths can also be manufactured and mounted on a common board to form a hybrid two-wavelength light source for use.

The DVD laser light beam L1, the CD laser light beam L2 emitted from the two-wavelength light source 2 is split into three beams through a diffraction grating 3 for generating three beams and then incident on a flat beam splitter 4. The beam splitter 4 is a semi-transparent half mirror for the laser light beams of both wavelengths. The laser light beam L1, L2 reflected at the right angle by the beam splitter 4 is reflected at the right angle by a mirror 5 and is incident on a collimate lens 6. The laser light beam L1, L2 is passed through the collimate lens 6 and is incident on an objective lens 7 as a collimated light flux and converges onto a record side 8, 9 of an optical record medium DVD, CD as an optical spot through the objective lens 7.

Return light beam L1r, L2r of the laser light beam L1, L2 reflected on the record side 8, 9 again returns through the objective lens 7, the collimate lens 6, and the raising mirror 5 to the beam splitter 4. The light component of a half the return light beam L1r, L2r returned to the beam splitter 4 is passed therethrough and is incident on a diffractive element 10 placed on the rear of the beam splitter 4. The return light beam L1r, L2r is diffracted by the diffractive element 10 on a different diffraction order and is introduced into a common light receiving element 11.

As shown in FIG. 5A, in the two-wavelength light source 2, the light emission points 101 and 102 of the laser light beams L1 and L2 are at different positions and are spaced about 30 to 300 $\mu$m from each other. Thus, if one light emission point is matched with an optical system axis passing through the collimate lens 6 and the objective lens 7 common to both the laser light beams, the laser light beam emitted from the other light emission point is shifted from the optical system axis and thus is slantingly incident on the common optical system made up of the collimate lens 6 and the objective lens 7. Therefore, the return light beams L1r and L2r of the laser light beams converge at different positions and thus cannot be received at the common light receiving element 11. Then, in the embodiment, the diffractive element 10 is used to diffract the return light beams L1r and L2r, thereby converging both return light beams at the same position. In other words, the light emission points 101 and 102 are placed at conjugate positions relative to the common light receiving element 11.

FIG. 2 is a schematic drawing to show the positional relationship between the diffractive element 10 and the common light receiving element 11. As shown in the figure, the light emission points 101 and 102 of the laser light beams L1 and L2 are shifted by a spacing $\Delta$ in a direction perpendicular to the optical axis and thus the return light beams L1r and L2r of the laser light beams incident on the diffractive element 10 are also shifted by the spacing $\Delta$. In the embodiment, the return light beams L1r and L2r are diffracted on different diffraction orders by the diffractive element 10, whereby they can be received by the common light receiving element 11 placed at a position near the optical system axis Lo as much as possible.

Figure 3A:
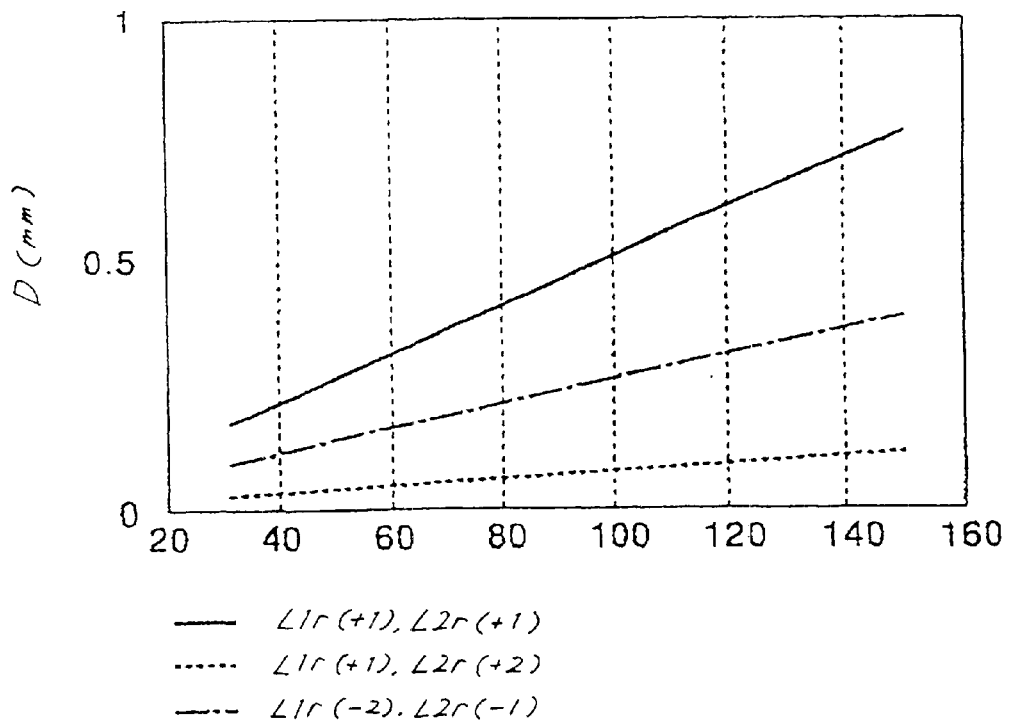
FIGS. 3A and 3B are graphs to show the relationship between a light emission point spacing and a light receiving position in the optical pickup device of two-light-source type.
Figure 3B:
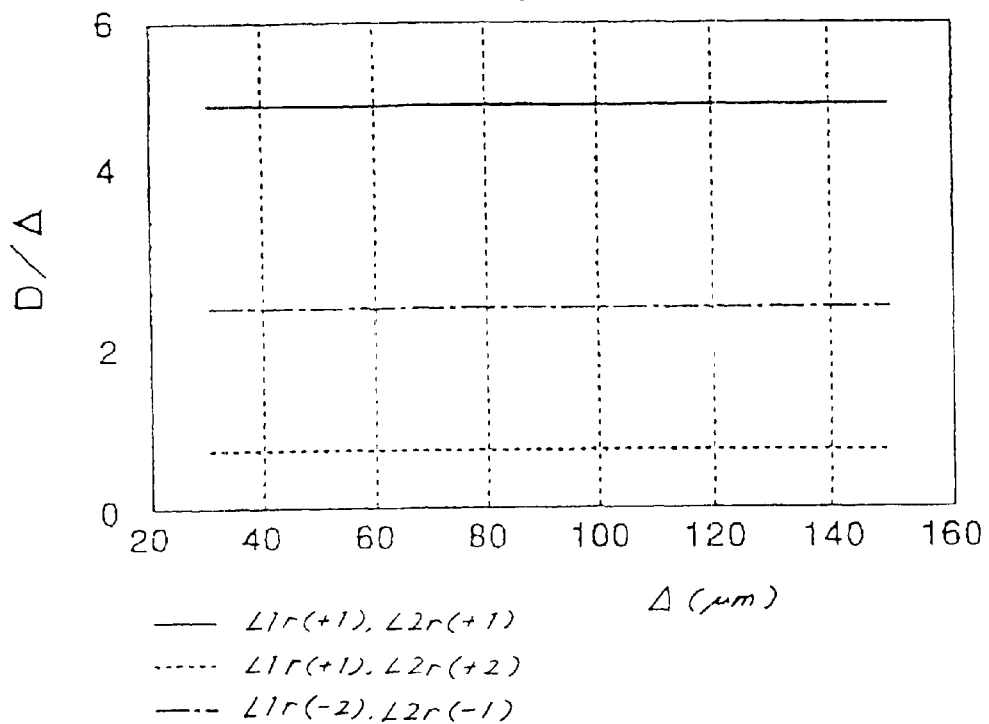

FIG. 3A is a graph to show the relationship between the light emission point spacing Δ and a distance D between the optical system axis Lo and a convergence point P of return light (common light receiving element 11) about combinations of diffracted light beams based on the orders in the return light beams L1r and L2r of the wavelengths. FIG. 3B is a graph to show change in D/Δ relative to the light emission point spacing Δ about the combinations of diffracted light beams based on the orders.

In the figures, a solid line indicates the case in the related art where both return light beams L1r and L2r are positive primary diffracted. A dashed line indicates the case where the return light beam L1r is positive primary diffracted and the return light beam L2r is positive secondary diffracted, and a chain line indicates the case where the return light beam L1r is negative secondary diffracted and the return light beam L2r is negative-primary diffracted.

As seen in the figures, to diffract return light beams different in wavelength with shifted optical axes and receive the light beams at the same position, if different diffraction orders are used in combination, the distance D from the optical system axis Lo can be lessened as compared with the case where primary diffracted light beams are used as in the related art. As seen in FIG. 3B, the spacing Δ and the distance D have almost proportional relationship, the proportion coefficient changes with the combination of the diffraction orders, and the proportion-coefficient if diffracted light beams on different diffraction orders are used in combination is smaller than that if primary diffracted light is used as in the related art. In the combination indicated by the solid line, the proportion coefficient is about 5, in the combination indicated by the dashed line, the proportion coefficient is about 0.714, and in the combination indicated by the chain line, the proportion coefficient is about 2.5

As the proportion coefficient is smaller, the common light receiving element 11 can be placed at a position near the optical system axis Lo and diffraction angles θ1 and θ2 of the return light beams L1r and L2r can be lessened. As the diffraction angles lessen, the light receiving position shift of the return light beams L1r and L2r on the common light receiving element 11, caused by wavelength fluctuation of the light source also lessens.

FIG. 4 is a graph to show change in the light receiving position dD caused by the wavelength fluctuation. It is a graph to show light receiving position shifts as to combinations of diffracted light beams based on orders, of the return light beams L1r and L2r with respect to the light emission point spacing Δ when the wavelength of each of the return light beams L1r and L2r changes to the plus side by 20 nm. A solid line, a dashed line, and a chain line represent combinations of diffracted light beams similar to those shown in the graph of FIGS. 3A and 3B. As seen in FIG. 4, to use the primary diffracted light beams of the return light beams L1r and L2r as in the related art, the light receiving position shift is 12 μm or more; to use light beams based on different diffraction orders, of the return light beams in combination, the light receiving position shift is drastically lessened.

Figure 2A:
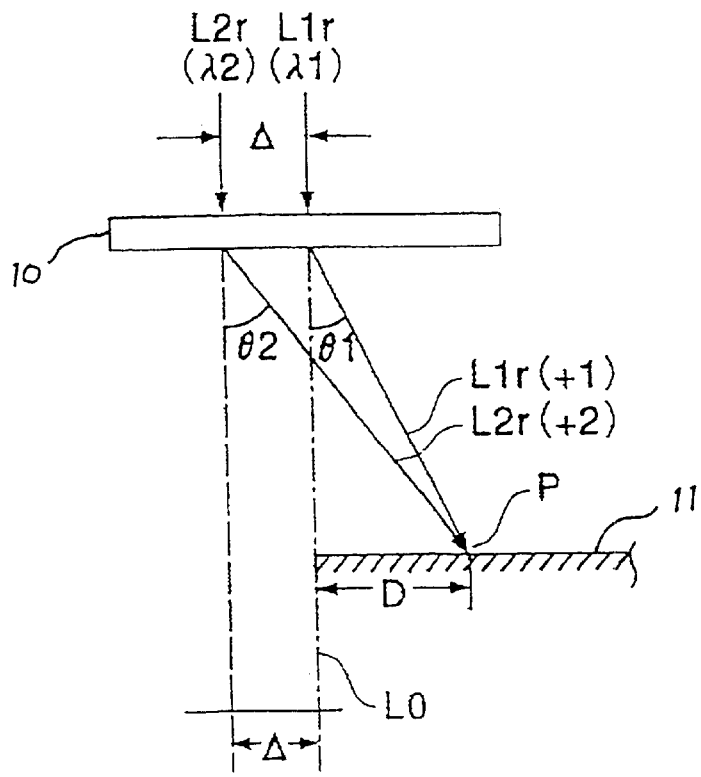
FIG. 2A is a schematic drawing to show a diffractive element and a common light receiving element in FIG. 1.

In the embodiment, based on the knowledge, the return light beams L1r and L2r are diffracted on different diffraction orders by the diffractive element 10 and are converged onto the common light receiving element 11. For example, as shown in FIG. 2A, positive primary diffracted light beam L1r (+1) of the return light beam L1r having the 650-nm wavelength and positive secondary diffracted light beam L2r (+2) of the return light beam L2r having the 780-nm wavelength are generated by the diffractive element 10 and are received at the common light receiving element 11. In this case, the characteristics indicated by the dashed lines in FIGS. 3A, 3B and 4 are provided and the light receiving position shift caused by wavelength fluctuation of the light source can be suppressed drastically as compared with use of primary diffracted light in the related art.

Figure 2B:
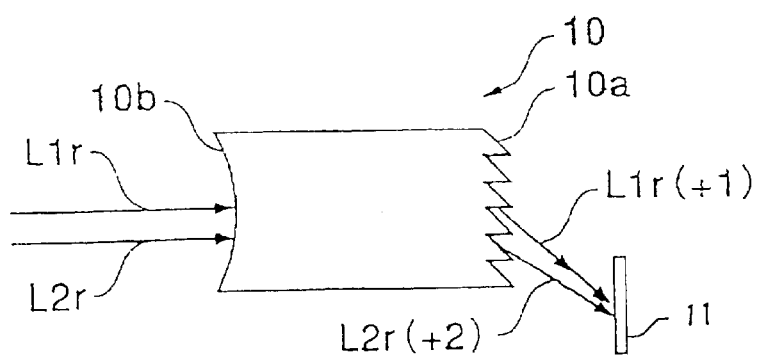
FIG. 2B is a schematic drawing to shown an example of the diffractive element.

As the diffractive element 10, it is preferable that a diffractive element having a diffraction grating 10a which is saw-toothed rather than rectangular in cross section, as shown in FIG. 2B should be used. To use the element having the shape, the light amounts of the diffracted light beams L1r (+1) and L2r (+2) toward the common light receiving element 11 can be increased and occurrence of diffracted light beams based on the same order with opposite signs can be suppressed, so that the yield of light can be enhanced. In the embodiment, the rectangular cross section or the saw-toothed cross section is formed on the light emission face side, but may be formed on the light incidence face side, of course.

To suppress a signal detection error caused by a light receiving position shift with wavelength fluctuation, it is desired that the diameters of the return light beams L1r (+1) and L2r (+2) received at the common light receiving element 11 should be enlarged. To enlarge the beam diameters, a concave lens may be used. In this case, as shown in FIG. 2B, if the light incidence face of the diffractive element 10 is made a concave 10b for giving a concave lens function to the diffractive element 10, an additional concave lens need not be placed, so that the optical system can be made compact. In the embodiment, the concave 10b is formed on the light incidence face side, but may be formed on the light emission face side. Further, the rectangular cross section or the saw-toothed cross section may be formed on the side formed with the concave 10b.

The optical pickup device 1 of the embodiment emits laser light of the corresponding wavelength in the two-wavelength light source 2 in response to the type of optical record medium placed in a reproduction system incorporating the optical pickup device 1 and reproduces or records information on the optical record medium. In the embodiment, to detect a focusing error signal, for example, an anastigmatic method is used for both CD and DVD. To detect a tracking error signal, a three-beam method is adopted for CD and a phase difference method is adopted for DVD. Thus, in the embodiment, to detect a focusing error signal, signal processing circuit based on the same principle can be shared for CD and DVD, so that complicating the signal processing circuit can be circumvented as compared with the case where a separate signal processing circuit is provided.

The optical pickup device of the embodiment is of two-light-source type. However, the invention can also be applied to an optical pickup device of multiple light source type for emitting laser light beams of three or more wavelengths. The light source wavelengths 650 nm and 780 have been covered, but the invention can also be applied to an optical pickup device comprising a light source for emitting laser light of any other wavelength. For example, the invention can also be applied to an optical pickup device comprising a blue light source of a shorter wavelength.

What is claimed is:

1. A light receiving method in an optical pickup device, comprising the steps of:

providing a first light source and a second light source, light emission points of which are not on an identical optical axis;

providing a common light receiving element;

emitting a first laser light beam and a second laser light beam respectively from the first and second light sources, wavelengths of which are different from each other;

converging the first and second laser light beams onto a record face of an optical recording medium; and diffracting the first and second laser light beams reflected from the optical recording medium based on different diffraction order, such that the diffracted first and second laser light beams are received by the common light receiving element, wherein the different diffraction order for the first and second laser light beams are respectively selected from the following combinations:

positive primary diffraction and positive secondary diffraction; and negative secondary diffraction and negative primary diffraction.

2. The light receiving method as set forth in claim 1, further comprising the step of passing the first and second laser light beams reflected from the optical recording medium through an enlarging optics, before the diffracting step.

3. The light receiving method as set forth in claim 1, further comprising the step of passing the first and second laser light beams reflected from the optical recording medium through an enlarging optics, after the diffracting step.

4. The light receiving method as set forth in claim 1, further comprising the step of detecting at least focusing errors in the first and second laser light beams, based on light amounts detected by the light receiving element, wherein the focusing errors in the first and second laser light beams are detected by the same processing.

5. An optical pickup device using the light receiving unit as set forth in claim 1, comprises a diffractive element for diffracting the first and second laser light beams reflected from the optical recording medium based on different diffraction order, which is formed with a diffraction grating having a saw-toothed cross sectional shape.

6. The optical pickup device as set forth in claim 5, wherein the diffractive element comprises a concave lens function.

* * * * *